United States Patent [19]
Billet

[11] Patent Number: 6,010,205
[45] Date of Patent: Jan. 4, 2000

[54] METHOD AND APPARATUS FOR IMPROVED PRINTING

[75] Inventor: Donald R. Billet, San Jose, Calif.

[73] Assignee: Raster Graphics Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/815,136

[22] Filed: Mar. 12, 1997

[51] Int. Cl.[7] .............................. B41J 2/145; B41J 2/15; B41J 29/393

[52] U.S. Cl. .................. 347/40; 347/41; 347/19

[58] Field of Search .................. 347/40, 19, 41

[56] References Cited

U.S. PATENT DOCUMENTS

| | | | |
|---|---|---|---|
| 4,463,359 | 7/1984 | Ayata et al. | 347/56 |
| 4,533,928 | 8/1985 | Sugiura et al. | 347/43 X |
| 4,748,453 | 5/1988 | Lin et al. | 347/41 |
| 4,907,013 | 3/1990 | Hubbard et al. | 347/19 |
| 4,999,646 | 3/1991 | Trask | 347/41 |
| 5,124,720 | 6/1992 | Schantz | 347/19 |
| 5,140,429 | 8/1992 | Ebunuma et al. | 347/19 X |
| 5,572,240 | 11/1996 | Schmidt | 347/17 |
| 5,627,571 | 5/1997 | Anderson et al. | 347/19 |

FOREIGN PATENT DOCUMENTS

0 568 283 A1  11/1993  European Pat. Off. ......... H04N 1/18

*Primary Examiner*—N. Le
*Assistant Examiner*—Thinh Nguyen
*Attorney, Agent, or Firm*—Burns, Doane, Swecker & Mathis, L.L.P.

[57] ABSTRACT

Exemplary embodiments of the present invention are directed to controlling an ink jet printing device during an interleaved, or overlap, mode of operation. Ink jet nozzles which would normally be inoperative during a given pass of the print head are selectively activated to compensate for nozzles determined to be inoperative.

15 Claims, 5 Drawing Sheets

MASK 55

|   | X |   | X |   | X |   | X |   | X | FIG._4A

MASK AA

| X |   | X |   | X |   | X |   | X |   | FIG._4B

MASK FF

| X | X | X | X | X | X | X | X | X | X | FIG._4C

|   | SCAN A | SCAN B |
|---|---|---|
| 1 | 55 | AA |
| 2 | 55 | AA |
| 3 | 55 | AA |
|   | ⋮ | ⋮ |
| 50 | NOZZLE OUT | NOZZLE OUT |
|   | ⋮ | ⋮ |
| 242 | FF | FF |
|   | ⋮ | ⋮ |
| 383 | 55 | AA |
| 384 | 55 | AA |

FIG._5A

|   | SCAN A | SCAN B |
|---|---|---|
| 1 | 55 | AA |
| 2 | AA | 55 |
| 3 | 55 | AA |
| 4 | AA | 55 |
|   | ⋮ | ⋮ |
| 50 | NOZZLE OUT | NOZZLE OUT |
|   | ⋮ | ⋮ |
| 242 | FF | FF |
|   | ⋮ | ⋮ |
| 383 | 55 | AA |
| 384 | AA | 55 |

FIG._5B

|  | SCAN A | SCAN B | SCAN C | SCAN D |
|---|---|---|---|---|
| 1 | 11 | 22 | 44 | 88 |
| 2 | 11 | 22 | 44 | 88 |
| ⋮ | ⋮ | ⋮ | ⋮ | ⋮ |
| 384 | 11 | 22 | 44 | 88 |

*FIG._5C*

METHOD AND APPARATUS FOR IMPROVED PRINTING

BACKGROUND OF THE INVENTION

1. Field of the Invention

The present invention relates generally to control of a printing device, and more particularly, to the control of such a device during printing in an interleaved mode.

2. State of the Art

Printing devices, such as ink jet printing devices, are well known. These types of printers are available from, for example, Hewlett Packard and ENCAD. As those skilled in the art will appreciate, ink jet printers often include at least one non-interleaved, or non-overlap mode of operation wherein no overlap of the print device over earlier printed bands occurs. Further, these devices include at least one interleaved, or overlap, mode of operation. To better assist in an understanding of the present invention, a brief review of an overlap mode of operation will be provided.

A typical ink jet printing device includes plural print heads, each of which includes a plurality of ink jet nozzles. The plural ink jet nozzles associated with a given color of printing ink can be displaced from one another in a vertical direction. In a non-overlap mode of operation, all of the ink jet nozzles are operated to print a continuous band as the print head is moved across a printable medium. Each pass of the print head across the printable medium (e.g., sheet of paper) constitutes a printed band. In the non-overlap mode, the print head is repeatedly scanned back and forth across the sheet without overlapping a previously printed band.

In contrast, in an overlap mode, the print head is controlled such that a given percentage of the print head, and thus the ink jet nozzles, overlap a previously printed band on the sheet (e.g., 25% or 50% of the nozzles in the print head overlap a previously printed band). As such, each area of the sheet is printed using multiple scans with different portions of the print head or heads. Such a technique is considered to improve the consistency of a printed image.

One drawback associated with conventional ink jet printing devices, regardless of whether they operate in an overlap mode or in a non-overlap mode, is that when one or more ink jet nozzles malfunctions, undesired inconsistencies can result in a printed image. This can be disastrous to a production run. It would therefore be desirable to provide some method and device which can account for the occurrence of malfunctioning ink jet nozzles without requiring discontinuation of the printing operation.

SUMMARY OF THE INVENTION

Exemplary embodiments of the present invention are directed to a method and apparatus for controlling an ink jet printing device during an interleaved, or overlap, mode of operation to compensate for malfunctioning ink jet nozzles. According to exemplary embodiments, when one or more ink jet nozzles is detected to be malfunctioning, ink jet nozzles which would not normally be used during a given scan of the print head are selectively activated to compensate for malfunctioning nozzles.

Generally speaking, exemplary embodiments relate to a method and apparatus for controlling ink jet nozzles of a printing device, by identifying ink jet nozzles in the printing device which have malfunctioned; and by controlling the output of remaining ink jet nozzles in the printing device to compensate for said malfunctioning ink jet nozzles.

BRIEF DESCRIPTION OF THE DRAWINGS

Other objects and advantages of the present invention will become apparent from the following detailed description of preferred embodiments when read in conjunction with the accompanying drawings, wherein like elements are designated by like reference numerals, and wherein.

DETAILED DESCRIPTION OF THE PREFERRED EMBODIMENT

Figure 1A:
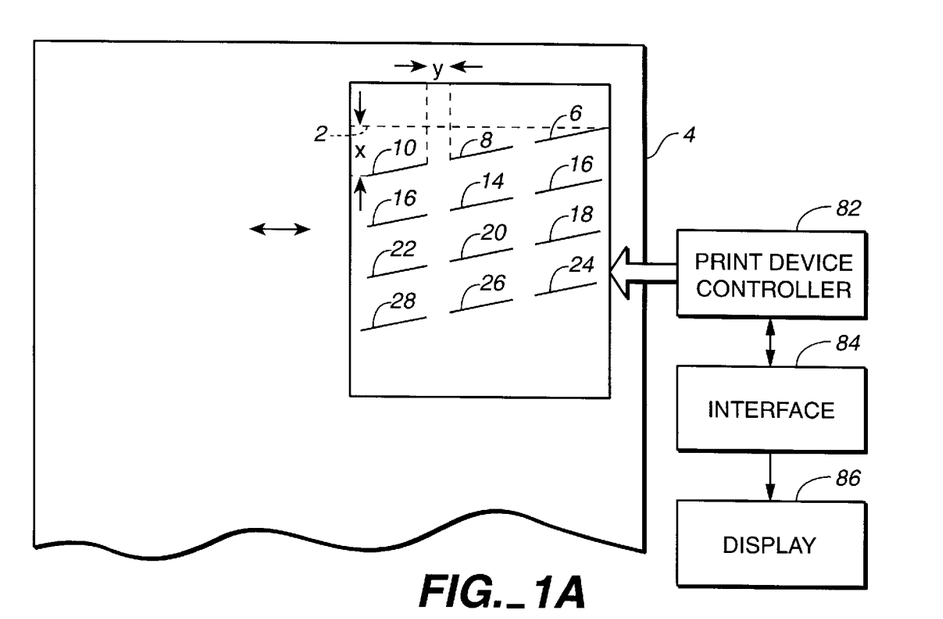
FIGS. 1A–1B show a print device and control system therefor, as well as a test image produced to detect malfunctioning nozzles.

FIG. 1A illustrates a print head and print head control system which can be used in accordance with exemplary embodiments of the present invention. In the exemplary FIG. 1A illustration, a print device having at least one print head is positioned over a sheet 4 of printable material (e.g., paper). Components used to mount the print device do not constitute part of the present invention and are therefore not illustrated in FIG. 1A for purposes of simplifying the drawing.

The print device 2 of FIG. 1A is shown to include plural print heads. While any number of print heads can be included on the print device 2, for purposes of simplifying the following discussion, 12 print heads labelled 6–28 are illustrated. In an exemplary embodiment, the three print heads 6, 8 and 10 are associated with a first color (e.g., black). The second row of three print heads 12, 14 and 16 are associated with a second color (e.g., yellow). A third row of print heads 18, 20 and 22 are associated with a third color (e.g., cyan). A fourth row of print heads 24, 26 and 28 are associated with a fourth color (e.g., magenta). Although three print heads are shown with respect to each color, those skilled in the art will appreciate that any number of such print heads can be associated with each color. Further, those skilled in the art will appreciate that any number of rows of print heads can be used to accommodate any number of different colors (e.g., six color printing can be implemented by adding additional rows of print heads).

The print device 2 is configured to scan back and forth horizontally across a printable medium, such as the sheet 4, and can be configured to print in both directions. To better understand the following discussion, an exemplary operation of the print heads will be provided.

Each of the print heads 6–28 includes a number of ink jet nozzles. For example, each of the print heads can be configured to include 128 such nozzles arranged along the length of the print head. When viewing the print heads associated with a given color (e.g., the print heads 6, 8 and 10 associated with the color black) in a vertical direction of FIG. 1A, the print heads are aligned such that the lowermost nozzle of the print head 6 is above the uppermost nozzle of the print head 8. Similarly, the lowermost nozzle of the print head 8 is located above the uppermost nozzle of the print head 10. Each row of print heads (i.e., the lower rows associated with the remaining colors, yellow, cyan and magenta) are similarly configured.

In a non-overlap mode of operation, a printed band would be produced on the sheet 4 by traversing the print device 2 across the sheet, with ink jet nozzles being selectively activated. For example, to produce a solid black band, all 128 ink jet nozzles in each of the print heads 6, 8 and 10 would be activated. Because the ink jet nozzles do not overlap in a vertical direction, a solid band would be produced as the print device 2 scans across the sheet, and this band would have a vertical height labeled "x". Note that the height "x" of the band is defined by the vertical span between the location of the uppermost nozzle of the print head 6 and the lowermost nozzle of the print head 10. A solid band of the colors yellow, cyan and magenta could be produced during the same scan in similar fashion to print four different color bands in one scan.

As those skilled in the art will appreciate, as the print device 2 scans back and forth across the paper. The print device 2 can be controlled to print in both directions. With each scan, the print device 2 moves downward in the vertical direction and/or the sheet 4 is moved upward, with the total relative movement between the print device and the sheet corresponding to one band. The various ink jet nozzles in the print heads 6–28 can be selectively controlled to lay down drops of ink of a given color at precise locations on the sheet, and thereby print a desired image of high resolution. The composite of these dots on the page results in the production of any desired image on the sheet 4.

In an exemplary embodiment, the print heads associated with a given color (e.g., the print heads 6, 8 and 10 associated with the color black) can be separated from one another in the horizontal direction by a predetermined width labelled "y" in FIG. 1A. The separation instance "y" can be provided between each of the print heads in the remaining rows of print heads for the colors yellow, cyan and magenta. For a greater discussion of a configuration of ink jet nozzles associated with a print device, reference is hereby made to co-pending U.S. application Ser. No. 08/815,590, (Attorney Docket No. 031228-003) entitled PRINTER HEAD CARRIAGE AND METHOD FOR ALIGNING PRINTER HEADS ON A PRINTER HEAD CARRIAGE, filed on even date herewith, and issued as U.S. Pat. No. 5,782,184 on Jul. 21, 1998, the disclosure of which is hereby incorporated by reference herein in its entirety.

The present invention is not limited to any specific configuration of a print device. For example, a print device which includes a single vertical column of ink jet nozzles, or which includes a single horizontal row of ink jet nozzles can be used. The nozzles can be used for monotone printing or can be separated into multiple groups wherein each group prints a different color. Alternately, multiple horizontal rows or vertical columns of ink jet nozzles can be used, wherein the nozzles of each row or associated with a different color ink. Numerous other variations in the print head configuration will, of course, be apparent to those skilled in the art.

As those skilled in the art will also appreciate, the ink jet nozzles themselves do not constitute a part of the present invention, and are readily available from such manufacturers as Hewlett Packard. For example, the nozzles can be piezo-electric controlled nozzles which can vary in their specifications with respect to their ink spray, or "firing", rate. This rate dictates the speed with which the scanning can be implemented. That is, the rate with which an ink jet nozzle can create a drop of a given size (or volume) on a sheet will dictate the speed with which the scan head can be moved across the sheet.

Having described an exemplary print device, an exemplary method and device for controlling ink jet nozzles of such a print device in accordance with the present invention will now be provided. According to a first step of an exemplary method of the present invention, a test phase is performed to detect and identify any ink jet nozzles which have malfunctioned. There are numerous ways in which a malfunctioning ink jet nozzle can be detected. In accordance with an exemplary method, a user interface is provided for identifying any non-working ink jet nozzles during a test run of the print device across the sheet 4 in a non-overlap mode (e.g., a mode wherein all 128 ink jet nozzles of each print head are sequentially activated at a predetermined time).

Figure 1B:
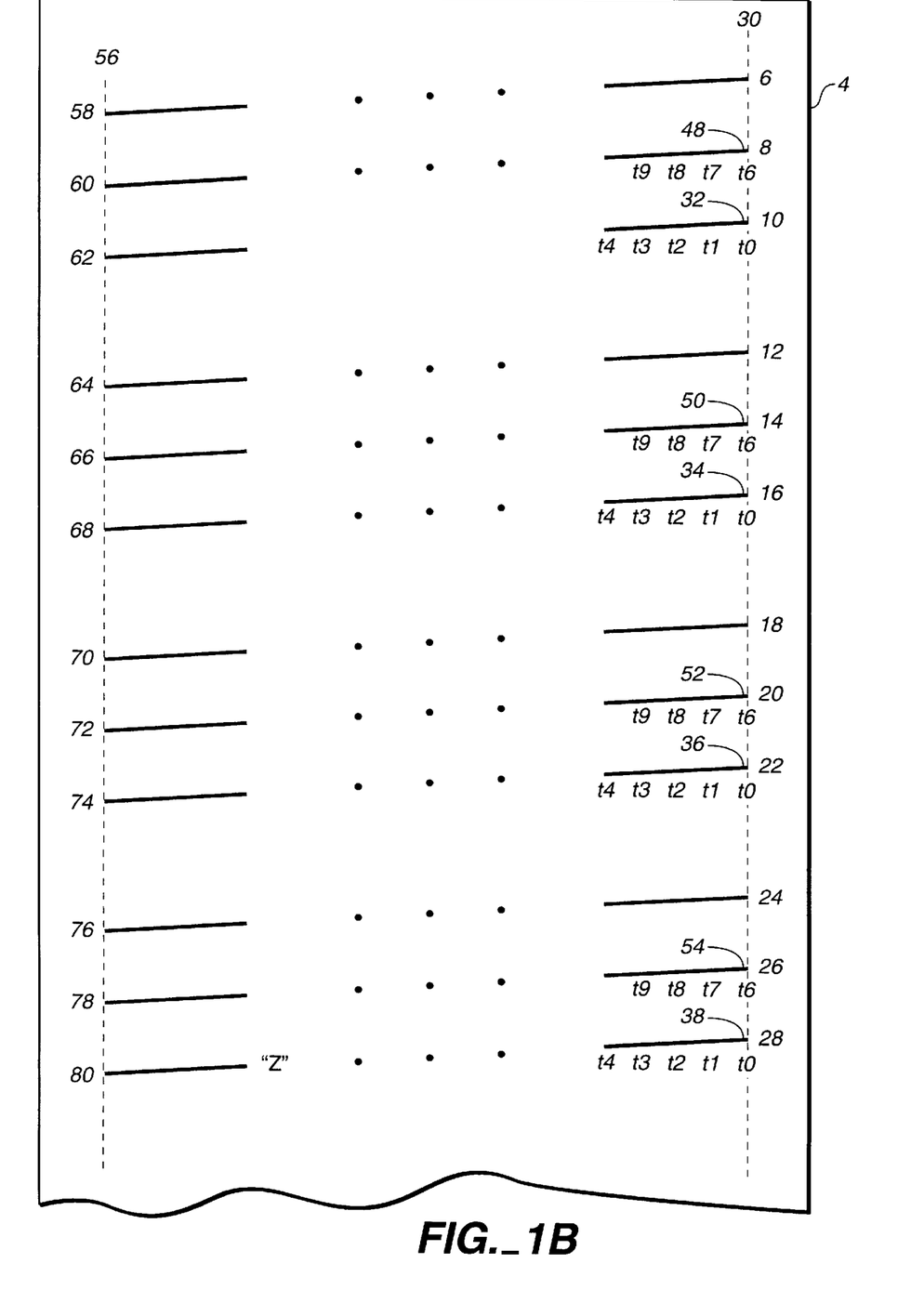

Referring to FIG. 1B, malfunctioning ink jet nozzles can be identified by activating a scan of the print device 2 across the sheet 4 to produce a plurality of print lines (i.e., one print line for each print head). The print lines are produced by sequentially activating the nozzles of each print head for a predetermined period of time, as represented by time increments $t_1$, $t_2$, $t_3$ and so forth. This process can be performed in parallel for each print head.

FIG. 1B illustrates the lines produced on sheet 4 by sequential activation of the ink jet nozzles in each print head during a single scan of the print device 2 across sheet 4 from right to left. As shown in FIG. 1B, the ink jet nozzles of each offset print head in the print device 2 are controlled so that the printing of each of the test lines 58–80 begins in vertical alignment with an imaginary, dashed line 30. In the FIG. 1B example, the sheet 4 is not moved during the printing of the line segments in this test phase. Therefore, each individual segment is horizontal, but is stepped one pixel down relative to a previously printed, adjacent segment as shown in FIG. 1B.

In an exemplary test phase for identifying malfunctioning ink jet nozzles, note that it is the uppermost nozzle for each of the print heads 10, 16, 22 and 28 which will first print at the imaginary vertical line 30 in FIG. 1B (i.e., assuming the print device 2 is scanning from right to left). Accordingly, the uppermost ink jet nozzle in each of the print heads 10, 16, 22 and 28 is activated from a time t0 until a time $t_1$ to produce a first printed segment for each of the colors: black, yellow, cyan and magenta. That is, the uppermost nozzle of the first print head 10 is activated from time t0 until time $t_1$ to produce a first printed segment 32 on the sheet 4 of FIG. 1B. The uppermost nozzle of the print heads 16, 22 and 28 similarly produce the printed segments 34, 36 and 38 from time $t_0$ until time $t_1$.

Although the first nozzle for each of the print heads 10, 16, 22 and 28 is shown to have produced a respective printed segment 32, 34, 36 and 38 in FIG. 1B, those skilled in the art will appreciate that if any one of these nozzles had not been operating, a segment would not have been produced in FIG. 1B. For example, if the first nozzle of print head 10 is malfunctioning, the location on printed sheet 4 where segment 32 was to have been printed would be blank. As will be apparent from a later discussion, this will be used to detect when a printed nozzle is malfunctioning, since the absence of a printed segment at a particular location on the sheet 4 can be correlated to a particular ink jet nozzle in the print device 2.

The foregoing operation is repeated for each ink jet nozzle in each of the print heads. As the print device 2 continues to scan to the left hand side of FIG. 1B, the next sequential ink jet nozzle on each of the print heads 10, 16, 22 and 28 is activated from time t1 to time t2. This process is repeated until all ink jet nozzles of each printed head have had an opportunity to print a segment at a predetermined location on sheet 4.

It will be further apparent to those skilled in the art that as a subsequent print head associated with a given color crosses the imaginary vertical line 30, its uppermost ink jet nozzle will be activated. In the exemplary illustration of FIG. 1B, it is assumed for purposes of this discussion that at time t6, the uppermost ink jet nozzle of the print heads 8, 14, 20 and 26 has reached the imaginary vertical line 30. Accordingly, at time t6, the sixth ink jet nozzle of the print heads 10, 16, 22 and 28 is activated to produce a respective segment. Similarly, the uppermost ink jet nozzle for each of the print heads 8, 14, 20 and 26 is activated at time $t_6$ to produce printed segments 48, 50, 52 and 54. As the print device 2 continues to scan from right to left across the sheet 4, the nozzles of the various print heads are sequentially activated. By the time a given print head reaches another imaginary vertical line 56 located on the left hand side of FIG. 1B, all ink jet nozzles of that print head have sequentially been activated for a predetermined period of time to produce one of the horizontal printed lines in FIG. 1B.

The exact timing associated with the control of the ink jet nozzles to produce the FIG. 1B segment, will be apparent to those skilled in the art and need not be described in detail. This timing will, of course, be a function of the speed with which the print head is scanned across the sheet, and the relative spacing between the print heads. It will be further appreciated that where a single print head having a single vertical column of nozzles is used for each color ink, the respective nozzles for each column (i.e., for each color) will be activated at the same time to produce the line segments used during the test phase to detect malfunctioning nozzles. As those skilled in the art will appreciate, it is only necessary that all nozzles of the print device be activated to print at some time so that malfunctioning nozzles can be properly identified.

Because each exemplary print head of the FIG. 1A embodiment includes 128 nozzles, each printed stepped line of FIG. 1B (e.g., stepped line 58 produced by print head 6) includes 128 segments, each segment having been printed by a respective one of the ink jet nozzles. The stepped line 60 corresponds to 128 segments sequentially produced by the 128 ink jet nozzles of the print head 8. The horizontal line 62 corresponds to 128 segments sequentially produced by the ink jet nozzles of the print head 10.

Similarly, stepped lines 64, 66 and 68 correspond to stepped lines produced by the print heads 12, 14 and 16, respectively. Stepped lines 70, 72 and 74 correspond to stepped lines produced by the print heads 18, 20 and 22, respectively. Stepped lines 76, 78 and 80 correspond to stepped lines produced by print heads 24, 26 and 28, respectively.

As mentioned above, if any nozzle was malfunctioning, a gap will exist in a horizontal line associated with a location in the FIG. 1B test line where that nozzle should have been printing. For example, assume that segment "z" of the horizontal line 80 corresponds to a location where the 95th ink jet nozzle of the print head 28 should have been printing. The absence of ink in this segment can be correlated by a user interface 84 (FIG. 1A) to the 95th nozzle of the print head 28 to identify the malfunctioning nozzle to the user. The user interface can be configured to correlate a missing segment to a particular nozzle automatically. Alternately, the user can be prompted to review the printed line segments (e.g., graphically review the test print) and then enter identification information (e.g., nozzle number) of any malfunctioning nozzles.

In accordance with an exemplary embodiment, the signals used by a print device control 82 to activate each nozzle of the printing device 2 in known fashion can be directed to the user interface 84. The user interface can receive these signals, and simulate the horizontal lines of FIG. 1B on a computer display 86, wherein nozzle numbers are correlated on the display 86 with the line segments. Alternately, the user can input the malfunctioning nozzle information. By viewing a graphical print and/or the display, the user can easily identify missing line segments. The user and/or the user interface can record those ink jet nozzles which are malfunctioning in a recording (e.g., digital memory) device. The malfunctioning nozzle information (i.e., the identification of the ink jet nozzles which are malfunctioning) can then be stored and processed to control the printing device via print device control 82 in a manner which compensates for malfunctioning ink jet nozzles.

Those skilled in the art will appreciate that other techniques for detecting malfunctioning ink jet nozzles can, of course, be used. For example, optical detection means (e.g., a charge-coupled device (CCD) camera) can be used in conjunction with the print device to optically identify those ink jet nozzles which are not operating properly. In an embodiment where such a camera is included at the printer location, the printer will already have information regarding the location of bad nozzles (e.g., by indexing a position of the camera to the nozzles being observed) and therefore doesn't need to send the information to the display identify and record malfunctioning nozzle information.

Once malfunctioning ink jet nozzles have been detected, identified and recorded, subsequent steps in accordance with an exemplary embodiment can be implemented to control the remaining, properly functioning ink jet nozzles to compensate for malfunctioning nozzles. Generally speaking, exemplary embodiments of the present invention operate the print device in an interleaved, or overlap, mode of operation, wherein less than 100% of the dots in a band are printed during each of the print head over the band on the sheet 4. During a subsequent scan, different nozzles of the print device are scanned over the band to print dots which were not printed during the first scan. In accordance with the present invention, nozzles which are properly functioning can be used during the subsequent scan to print areas of the band that should have been printed by the malfunctioning nozzles during the earlier scan (or vice versa).

Figure 2A:
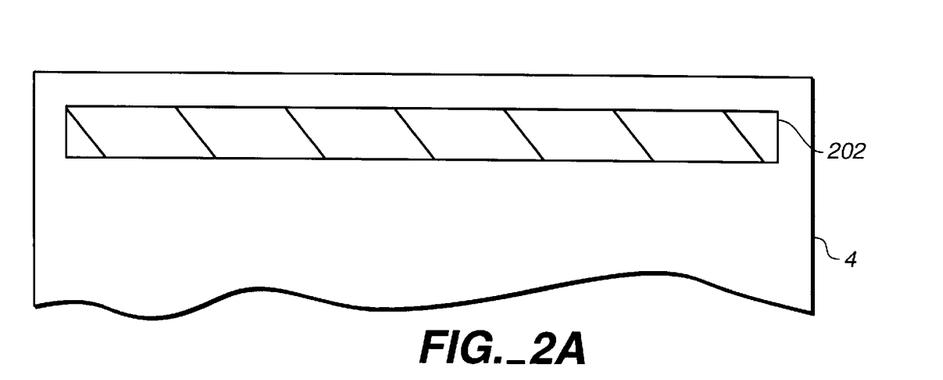
FIGS. 2A–2C illustrate an overlap mode in accordance with an exemplary embodiment of the present invention.

Before discussing compensation for malfunctioning nozzles, a brief review of a 50% overlap mode and a 25% overlap mode will be provided. Referring to FIG. 2A, printing in a 50% overlap mode will be discussed. During a first scan, or pass, of a printing device over a sheet, special print control is used; that is, printing is performed to produce an initial band 202 using less than all of the nozzles associated with the print heads provided for the color magenta. In this initial pass the lower half of the 384 nozzles in the print heads 24, 26 and 28 is used to print the first scan of the first band on the sheet After this initial scan, all 384 nozzles are used during subsequent scans, with the uppermost nozzles filling in unprinted dots of the first scan, and with the lowermost nozzles printing the first scan of a subsequent band. Thus, after the initial band has been printed, the relative vertical position of the print device and the sheet is adjusted so that the upper half of ink jet nozzles are located over the band 202 for purposes of implementing a second pass over the band. For example, where 384 nozzles are used for each color, the print device and/or the sheet are stepped relative to one another in a vertical direction by a distance corresponding the span of 192 nozzles. For printing in the 50% overlap mode, all of the nozzles are used to produce only 50% of the dots (e.g., every other dots).

Thus, in a 50% overlap mode, only 50% of the dots are printed using all of the ink jet nozzles. The upper one half of the nozzles of the 384 is passed over the printed portions of the band 202 to superpose ink on that band. The lower half of the 384 nozzles supply ink to an unprinted portion of the sheet 4, as represented by band 204 in FIG. 2B. As such, the band 202 has been printed with two passes of the printing device to produce all dots of a given color ink in that portion. In contrast, only one half of the printed dots of the same color ink associated with the lower band 204 in FIG. 2B have been printed at this time.

Figure 2B:
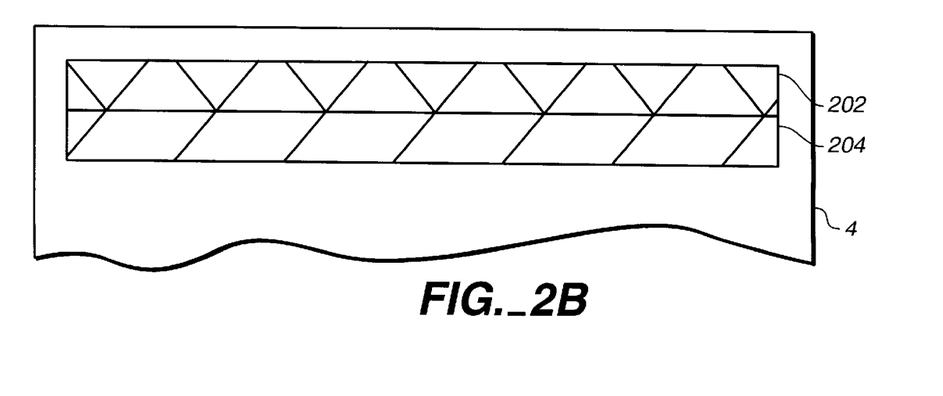
Figure 2C:
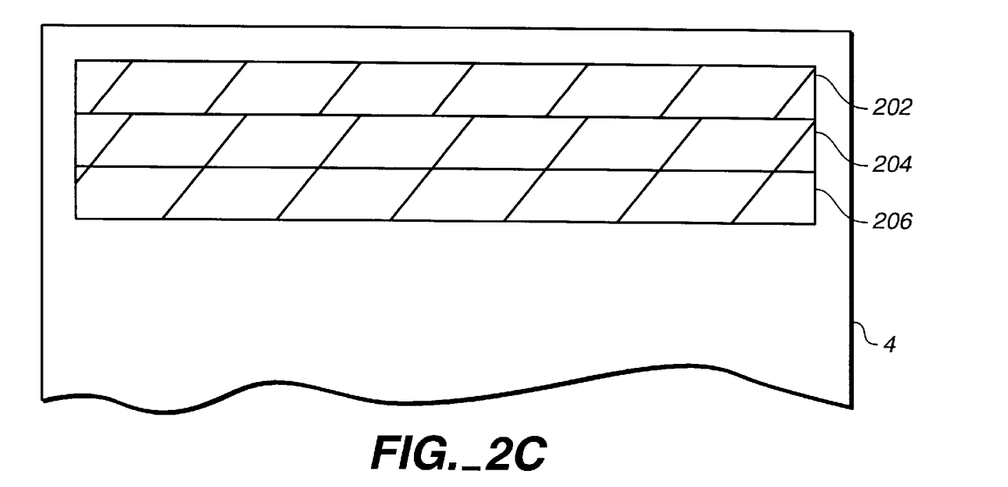

Before a third pass of the printing device 2 over the FIG. 2B image, the print device is again moved vertically downward relative to the sheet by a vertical distance which corresponds to the height of the original band 202. Next, as illustrated in FIG. 2C, the upper one half of the nozzles in the printing device 2 pass over the previously printed portion of the band 204 to fill in the missing dots of the given color ink which were not printed when this band 204 was originally created. The lower half of the nozzles in the printing device pass over an unprinted portion of the sheet to print a first portion of the band 206. Again, only 50% of the dots (e.g., pixels) of a given color ink are printed in band 206 at this time.

The foregoing process is repeated until the entire sheet has been printed. As those skilled in the art will appreciate, this process results in the printing heads associated with each color ink scanning each band of the image twice, using a first set of nozzles of the printing heads associated with a given color to produce a first set of dots in each band, and using a second set of ink jet nozzles of the printing heads associated with the same given color to produce a second set of dots in each band during a second pass. This process is repeated in each band for each color ink. (For example, after a complete band of magenta has been printed, the band can be successively scanned and printed with cyan, yellow and black ink. thus, for four color printing, each band is scanned eight times (i.e., twice for each color).

In a 50% overlap mode, every other dot associated with a given location of the sheet (e.g., each square inch) is printed during a first scan, or pass, over the sheet. Afterward, the print device or the sheet is shifted vertically by one half of the distance associated with the vertical height spanned by the print device, such that print device overlaps the previously printed band. During a second pass, the dots which were not printed in a given band are printed.

During the final pass over the sheet, special treatment which is similar to the special treatment used during the first scan over the sheet is used. That is, in the final scan, the entire lower half of all nozzles are deactivated. That is, 50% of the dots from only the upper half of all nozzles are printed to fill in the missing dots of the last printed band.

Now that the 50% overlap mode of operation has been provided, a brief review of the 25% overlap mode will be provided. In principle, this mode is similar to the 50% mode, except that during each of four scans over a band using the print heads associated with a given color of ink, only every fourth dot is printed. During each of three subsequent passes over a given band of the sheet, another of the four dots associated with a given color ink is printed in the band. Thus, four scans of the print device 2 are required to print each band of a sheet with a given color of ink.

Figure 3:
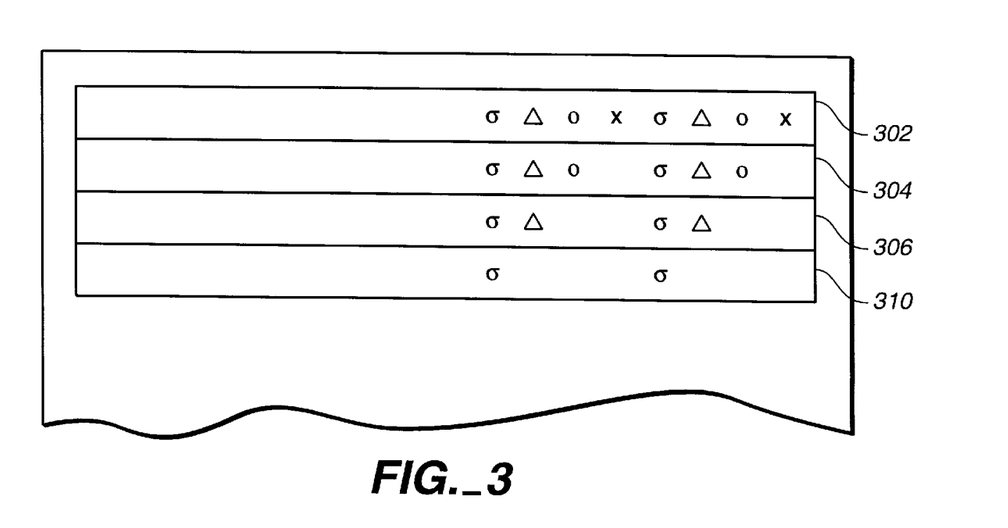
FIG. 3 illustrates a 25% overlap mode of operation in accordance with an exemplary embodiment of the present invention.

To illustrate the 25% mode, reference is made to FIG. 3 wherein four bands of a given color (e.g., magenta) are to be printed. During a first scan, the lowermost one quarter of the ink jet nozzles in the magenta print heads are used to produce a band having a height which is one quarter the height of a band which could have been printed if all ink jet nozzles available to print magenta were activated. This is represented in FIG. 3 by the band 302, which represents one quarter of the total vertical span of the print heads associated with a given color. During the production of the band 302, a first of every four dots in the lower one quarter of the print device is printed to produce the dots marked "x". Subsequently, the printing device and the sheet are moved relative to one another by a vertical distance corresponding to one quarter of the vertical height spanned by all nozzles associated with printing print heads of a given color.

During a second scan, the lower one half of all ink jet nozzles are used for printing. In this lower one half of all ink jet nozzles, the second of every four dots is printed. As such, a band labelled 304 is produced with every fourth dot of the lowermost quarter of nozzles associated with a given color. Another quarter of the nozzles overlap the originally printed band 302. The dots printed in this second scan are labelled "o". Subsequently, the print device and the sheet are moved relative to one another by a vertical distance corresponding to one quarter the vertical height spanned by all nozzles associated with printing a given color.

In the third scan, the third of every four dots is printed to produce a resultant band 306. Note that during this pass, the original band 302 and the original band 304 are overlapped. The pixels printed during this band are labelled "Δ". Afterwards, the print device and the sheet are again vertically moved relative to one another.

During a fourth scan, a fourth of every four dots is printed, as represented in FIG. 3 by "σ". Note that in this case, the print device encompasses four bands, and that after this scan all dots of a given color (e.g., magenta) in the first band 302 have now been printed. In band 304, ¾th of the dots have been printed. In the band 306, one half of the dots have been printed. In the lowermost band 310, only every fourth dot has been printed.

As can be seen from the foregoing discussion, four passes are required to print each band with a given color of ink. This is repeated in the band for each different color ink. The foregoing process is repeated until the entire sheet has been printed.

Exemplary embodiments of the invention use an overlap mode of operation, such as the 50% overlap mode or the 25% overlap mode described above, to control properly functioning nozzles such that they compensate for malfunctioning nozzles. In a typical non-overlap mode of operation, the print device can be operated at a maximum scanning speed selected on the basis of the maximum firing rate of the ink jet nozzles. Where each nozzle operates in a mode at its fastest rate, this mode cannot be used in accordance with the present invention. That is, where all nozzles are already operating at their maximum firing rate, there is no nozzle available to compensate for a malfunctioning nozzle.

However, in modes of operation wherein the nozzle firing speed is not at its maximum, compensation for malfunctioning nozzles can be implemented. For example, in a 50% overlap mode wherein the scanning speed is the same as that used for the non-overlap mode, only 50% of the maximum firing rate is required for each ink jet nozzle. Accordingly, nozzles can be activated in this mode of operation to fill in for malfunctioning nozzles. However, as those skilled in the art will appreciate, if the scanning speed of the print device is doubled (e.g., increased from 16 inches per second to 32 inches per second), then once again, all nozzles will be required to operate at their maximum firing rate, and no nozzles will be available to fill in for malfunctioning nozzles. As those skilled in the art will appreciate, any ink jet printer having an overlap mode can be used in accordance with exemplary embodiments of the present invention, provided the printer is operated in a mode which does not require using the entire bandwidth of the print head (e.g., such printers are available from RASTERGRAPHICS, Inc. of San Jose, Calif., Hewlett Packard of Palo Alto, Calif., or other similar printing devices).

Thus, exemplary embodiments of the present invention exploit unused bandwidth to compensate for malfunctioning nozzles. In a 50% overlap mode, if one or more of the nozzles is functioning improperly, the ability to completely print a given band is lost. Accordingly, exemplary embodiments of the present invention compensate for this by using either an earlier scan or a subsequent scan to produce not only the dots for the given scan, but also to print those dots which should have been printed in a different scan over the same band, by modifying the control for the print head.

Depending on what nozzle in what head is out, a nozzle in a subsequent or previous band can be used. For example, in a 50% overlap mode, if nozzle 50 in head 6 (from FIG. 1A) is malfunctioning, a nozzle 192 nozzle locations away (e.g., nozzle 242; i.e., nozzle 114 in head 8) can be used to compensate. That is, nozzle 114 of head 8 is in the lower half of the 384 nozzles, and can compensate nozzle 50 during a subsequent scan. Alternately, if the 242 nozzle is malfunctioning, the nozzle 50 of an earlier scan over the band can be used to compensate. In summary, for a 50% printing mode wherein 384 nozzles are used to print a given color ink, the nozzle number which is 192 nozzle locations from the improper functioning nozzle can be used to print both the dots which it was intended to print, as well as the dots which should have been printed by the malfunctioning nozzle during a different scan over the band.

An exemplary implementation of this compensation feature is achieved by creating a look-up table having a number of entries which corresponds to the number of nozzles in the print head (or heads) used for each color (e.g., 384 entries for the FIG. 1A print device). In an exemplary embodiment, a look-up table is provided for each scan over a given band. Thus, for four color printing in a 50% mode, eight look-up tables can be provided (two for each color ink). For four color printing in a 25% mode (where each band is printed using four scans of each color), sixteen look-up tables can be provided (four for each color).

Figure 4A:
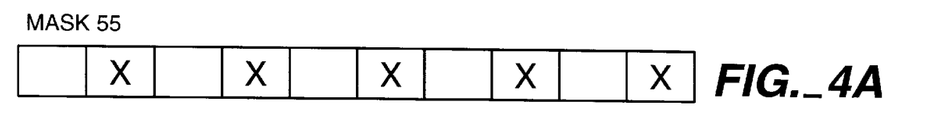
FIGS. 4A–4C illustrate scan masks for use in ink jet nozzle control according to an exemplary embodiment of the present invention.
Figure 4B:
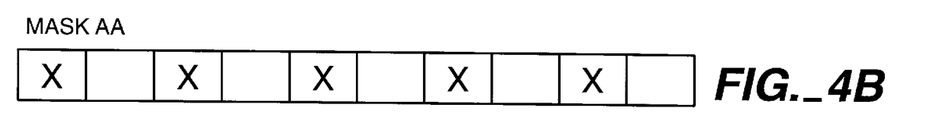
Figure 4C:
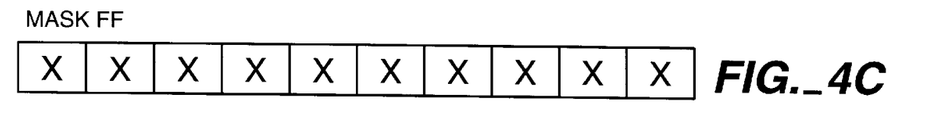

Each entry of the look-up table includes a mask to control the printing of dots during a given scan. In an exemplary embodiment, a hexidecimal notation can be used for the masks. For example, a mask shown in FIG. 4A can be represented in the look-up table by the hexidecimal number "55H" (see FIG. 5A), where "H" merely denotes that "55" represents the hexidecimal mask of FIG. 4A. The total number of dots which can be printed in a line across the sheet 4 by an individual nozzle during a single scan across the sheet corresponds to the total number of entries in the mask or a multiple thereof (e.g., where the mask is repeated within each line). For a subsequent scan over the same line of the band, the mask would be "AAH" as shown in FIG. 4B. Thus, for a first scan A over any given line of a band, all of the masks are represented as "55", while for each interleaved scan B over the same line of the band, the mask would be "AA", or vice versa. Where the nozzle used to print the dots associated with the mask of FIG. 4A is malfunctioning, the mask of FIG. 4A is "ORed" with the mask of FIG. 4B to produce a compensatory mask "FFH" of FIG. 4C. The mask of FIG. 4C controls an ink jet nozzle of another scan over the line of the band so as to print the dots which should have been printed via the mask of FIG. 4A, as well as the dots printed via the mask of FIG. 4B.

Figure 5A:
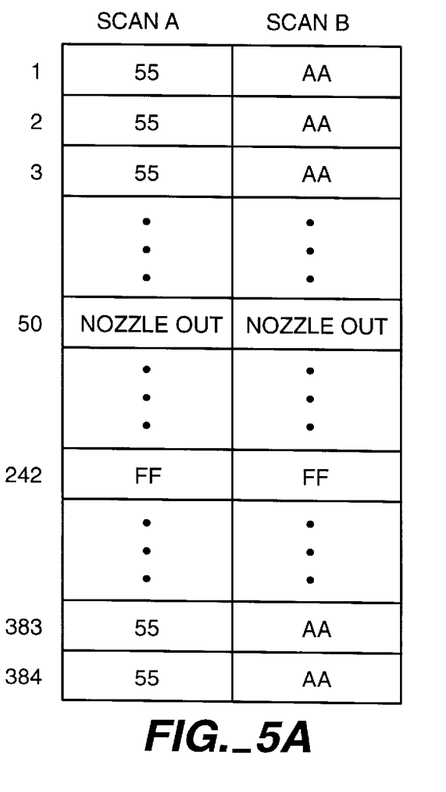
FIGS. 5A–5C illustrate look-up tables for implementing compensation of scan masks in accordance with exemplary embodiments of the present invention.
Figure 5B:
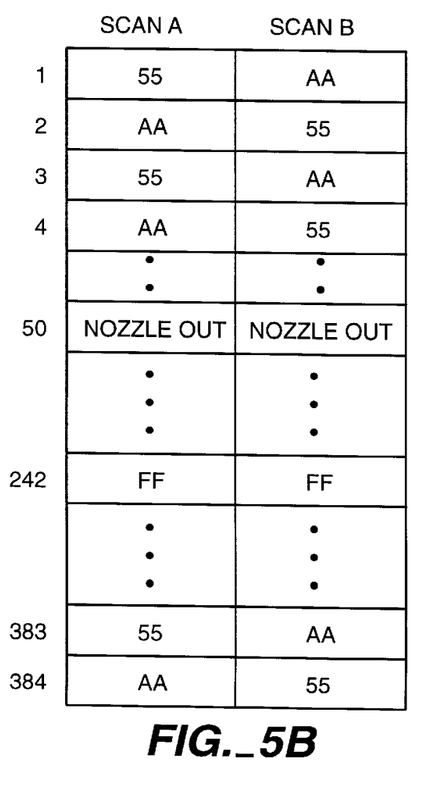

The look-up table can be stored for each scan, or can be regenerated for each band, such that there is no need to provide a different table for each scan. Where every other mask is the same (as in a 50% overlap mode), the look-up table can flip back and forth between the masks for two scans over each band as shown in FIG. 5A, wherein the first column illustrates masks for controlling the 384 nozzles associated with a given color during a first scan over a band, and the second column illustrates masks for controlling 384 nozzles associated with the same color during a second scan over the band. FIG. 5B illustrates a selection of masks which can be used to create a checkerboard pattern of ink jet nozzle control.

Referring to FIG. 5A, assume that a missing nozzle number 50 is detected which affects the dots printed during the first scan A over a given band. The contents of the scan B over the band are modified to compensate for this. As such, when the scan B over the band is performed, nozzle number 242 is activated to fill in for the missing nozzle (i.e., the nozzle 192 locations from nozzle 50). To achieve this, in line number 242 of the scan B look-up table, an entry is created which includes the mask of "AA", plus an instruction to activate a nozzle to fill in for the malfunctioning nozzle (that is, the scan masks "55"and "AA" of FIGS. 4A and 4B are "ORed" to produce the FIG. 4C mask as an entry 242 of the FIG. 5A "Scan B" look-up table. Thus, the scan B mask has been modified.

The scan A mask look-up table must also be modified because in printing during scan B, nozzle 50 was again inactive. Therefore, in the scan A look-up table, the scan A mask at location 242 is also compensated for the fact that nozzle number 50 was out during the scan B. To achieve this compensation, the scan A and scan B masks are again "ORed" to produce the FIG. 4C mask for storage of nozzle location 242 of the scan A look-up table. A similar compensation has been illustrated in the two FIG. 5B look-up tables used to implement a checkerboard pattern of dot printing in a given color. Those skilled in the art will appreciate that look-up tables associated with the remaining three colors of ink can be similarly produced.

Thus, exemplary embodiments control the output of ink jet nozzles in a printing device to compensate for malfunctioning nozzles by generating a look-up table of control signals for the nozzles, and by modifying contents of entries in the look-up table to account for malfunctioning nozzles.

Note that in the 50% mode described above, the look-up table is regenerated for each scan, and the same entry in both the A scan mask and the B scan mask will be modified. However, those skilled in the art will appreciate that separate tables for the scan A and the scan B masks can be generated and stored. During printing, the system can then track which scan mask is currently being used, and then activate the appropriate look-up table. Note that theoretically, in the 50% mode, one half of the nozzles can be malfunctioning, and yet 100% of an image can be printed provided a properly functioning nozzle is located 192 nozzle locations away from all malfunctioning nozzles.

Figure 5C:
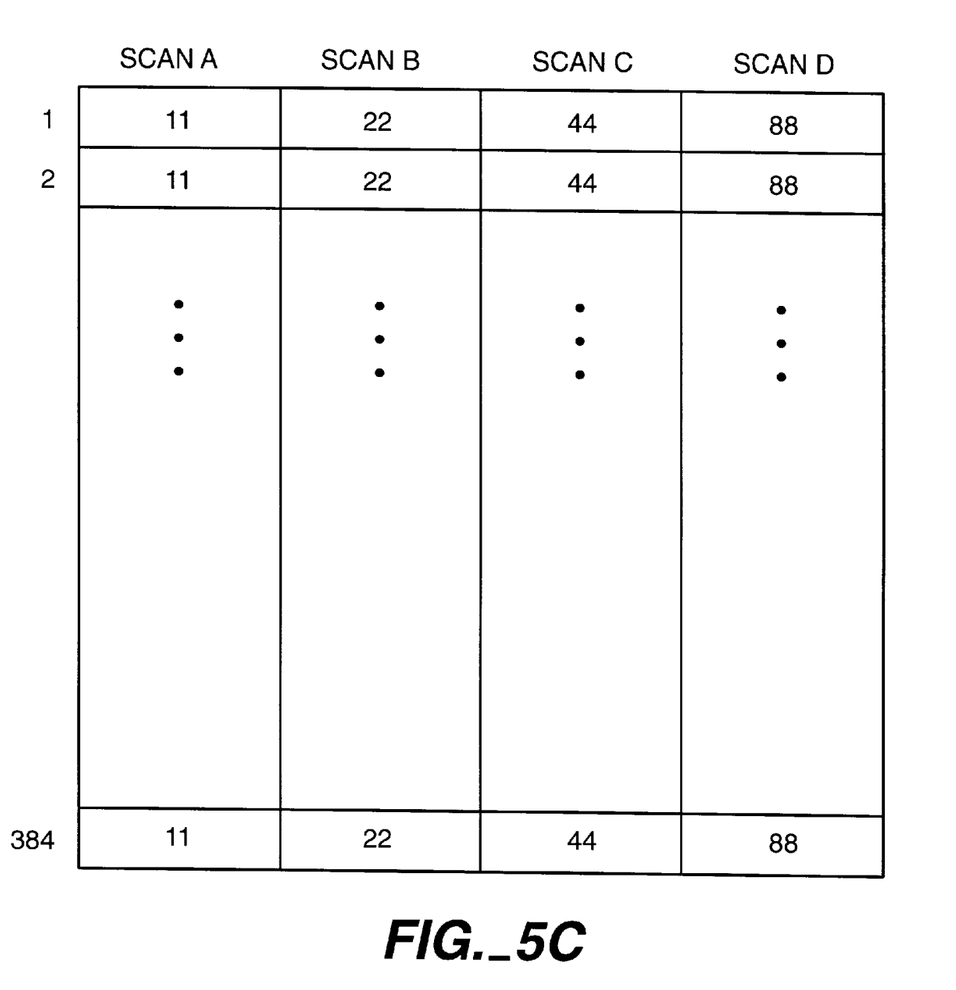

Having described a 50% mode of operation, a 25% mode of operation will now be discussed. A 25% mode has, in an exemplary embodiment, four look-up tables for each color ink as shown in FIG. 5C. Thus, if a nozzle is malfunctioning, there are three other scan masks that can be modified to fill in for the malfunctioning nozzle. Accordingly, malfunctioning nozzles can be compensated for by using a nozzle in a previous or a subsequent scan that is 96 nozzles away from the malfunctioning nozzle, or by using a nozzle two scans away (e.g., 192 nozzles) from the malfunctioning nozzle, or by using a nozzle three scans away (e.g., 288 nozzles) from the malfunctioning nozzle. Further, each of the four look-up tables must be corrected in a manner similar to that described with respect to compensating for malfunctioning nozzles in the 50% mode.

For example, consider the mask for each nozzle during scan A is "0X11", the mask for scan B is "0X22", the mask for each nozzle during scan C is "0X44"; and the mask for each nozzle during scan D is "0X88" as shown in FIG. 5C. As those skilled in the art will appreciate, each of these masks results in one of every fourth dot being printed during a given scan. However, where a particular ink jet nozzle is malfunctioning, any of the remaining three scans associated with each printed band can be used to compensate for the malfunctioning nozzle. As such, two nozzles which are offset by 96 nozzles can be malfunctioning, and still achieve complete printing.

Having generally described 50% and 25% overlap modes, alternate embodiments will now be described in accordance with exemplary embodiments of the present invention. One alternate embodiment achieves increased quality by staggering nozzles which are activated during successive bands in, for example, a checkerboard pattern as described with respect to FIG. 5B. Of course, when a malfunctioning nozzle is detected, the generated compensation for the table entries will change accordingly (as described previously). Note that in a 50% mode, the same logic function will result in two entries to the look-up table which will repeat, regardless of whether the checkerboard pattern is implemented or not.

In contrast, in a 25% mode, any number of different patterns can be used. To correct for malfunctioning nozzles in scan B, a revision to the scan A mask is required. Similarly, to compensate for malfunctioning nozzles of scan A, compensation to the scan B mask is required. In scan C, nozzles which could not be printed in scan B can be compensated. Similarly, in scan D, nozzles which could not be printed in scan C are compensated. This is repeated for each of the scans during the printing process. The key is that malfunctioning nozzles in a current scan are compensated in a previous or subsequent scan.

Of course, those skilled in the art will appreciate that in a 25% mode, the scan masks need not repeat every fourth scan. For example, they could repeat every eight band or every twelfth band. Those skilled in the art will appreciate that any desired configuration can be used, it only being necessary that all dots are printed despite the existence of malfunctioning nozzles.

Having described the use of alternate patterns in the look-up table, yet another alternate embodiment of the present invention will be described as a "double strike" mode. The double strike mode is used to print on difficult-to-print surfaces such as vinyl where an ink dot does not spread out very well on the printable medium. In a double strike mode (2), unlike a single strike mode (1), all dots of a band are printed during a first scan. Afterwards, the band is rescanned to create two layers of ink on each dot. As such, the full bandwidth of the print device is required even during a 50% mode. However, if a double strike mode is implemented in a 25% printing mode, then 100% bandwidth is not required and compensation according to the present invention can be implemented. A summary of exemplary embodiments which can be used to implement compensation (comp) of the present invention for nominal speeds (1x) and twice nominal speeds (2x) is set forth in the following table:

| SPEED | OVERLAP | STRIKE | COMP | COVERAGE ON LINES WITH MISSING NOZZLES |
|-------|---------|--------|------|----------------------------------------|
| 1x | no | 1 | no | 0% |
| 1x | 50% | 1 | yes | 100% |
| 1x | 50% | 2 | no | 50% |
| 1x | 25% | 1 | yes | 100% |
| 1x | 25% | 2 | yes | 100% |
| 2x | 50% | 1 | no | 50% |
| 2x | 25% | 1 | yes | 100% |
| 2x | 25% | 2 | no | 75% |

Of course, those skilled in the art will appreciate that embodiments of the invention can be varied from the exemplary embodiments described above. For example, as mentioned previously, any print head configuration which can be operated in an overlap mode of operation can be used. Further, any number of print heads and ink colors can be used in accordance with the present invention. In addition, any type of memory can be used to store the masks used to control the ink jet nozzles of the various print heads. For example, a single memory device can be used to store the masks for all print heads. Further, rather than storing a separate mask for every ink jet nozzle as shown in FIG. 5A, a single mask could be stored for each of the scan A and scan B print operations. In addition, any masks which have been modified can be stored with an identifier that associates the mask with a given nozzle. During a print operation, the device controller can track which nozzle should be printing at any given time, and if necessary, access a modified mask for a nozzle whose control has been altered to compensate for a malfunctioning nozzle. Of course, those skilled in the art will appreciate that any of a number of methods for storing scan mask information can be used, and the present information is not limited by the exemplary embodiments of the scan mask storage as described above.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for controlling ink jet nozzles of a printing device as the nozzles scan at least once over a printing medium to print at least one band on the printing medium, comprising the steps of:

identifying functional and malfunctional ones of the ink jet nozzles in the printing device; and controlling outputs of the functional ink jet nozzles in the printing device to compensate for malfunctional ink jet nozzles, wherein none of the functional ink jet nozzles are disabled to compensate for the malfunctional ink jet nozzles, and wherein non-compensatory nozzle output and compensatory nozzle output from the functional ink jet nozzles both occur during at least one of the at least one scans;

storing information for controlling the functional ink jet nozzles in a look-up table;

scanning the printing device over the printing medium at least once; and regenerating the information stored in said look-up table for each scan of said printing device over the printing medium.

2. Method according to claim 1, wherein said step of identifying further includes a step of:

sequentially activating each of said ink jet nozzles.

3. Method according to claim 2, wherein said step of sequentially activating further includes a step of:

activating each of said ink jet nozzles for a predetermined period of time.

4. Method according to claim 3, wherein during the step of activating each ink jet nozzle is activated for the predetermined period of time at a different location, and each functional ink jet nozzle prints a line segment at the corresponding different location, and each activated malfunctional ink jet nozzle fails to print a line segment at the corresponding different location, and said step of identifying further includes a step of correlating an absence of a printed line segment at one of the different locations to a particular one of the ink jet nozzles.

5. Method according to claim 4, wherein said step of identifying further includes a step of:

simulating line segments printed during said step of sequentially activating said ink jet nozzles on a display.

6. Method according to claim 5, wherein said step of identifying further includes a step of:

storing information which identifies the ink jet nozzles which have malfunctioned in a memory.

7. Method according to claim 1, wherein said step of controlling further includes a step of:

operating said printing device in an interleaved mode of operation; and using the functional ink jet nozzles in one scan over the at least one band to compensate for portions of the at least one band that should have been printed by the malfunctional ink jet nozzles during another scan over the at least one band.

8. Method according to claim 7, further including the steps of:

scanning the printing medium with said printing device in a first direction; and shifting a relative location of said printing device and the printing medium in a second direction which is perpendicular to said first direction.

9. Method according to claim 7, wherein said operation is a 50% interleaved mode of operation.

10. Method according to claim 7, wherein said operation is a 25% interleaved mode of operation.

11. The method of claim 2, wherein the step of controlling the output of functional ink jet nozzles in the printing device includes controlling a speed at which the ink jet nozzles pass over the printing medium.

12. The method of claim 11, wherein the speed is greater than a maximum speed at which each ink jet nozzle can print a continuous line on the printing medium.

13. The method of claim 1, wherein the compensation does not require additional scans of the nozzles over the printing medium.

14. Apparatus for controlling ink jet nozzles of a printing device as the nozzles scan at least once over a printing medium to print at least one band on the printing medium, comprising:

a user interface for storing information regarding ones of the ink jet nozzles determined to be malfunctional and displaying information which identifies the malfunctional ink jet nozzles; and a print device controller for controlling outputs of functional ones of the ink jet nozzles of the printing device based on the information stored in the user interface to compensate for the malfunctional ink jet nozzles, wherein none of the functional ones of the ink jet nozzles are disabled to compensate for the malfunctional ink jet nozzles, and wherein non-compensatory nozzle output and compensatory nozzle output from the functional nozzles both occur during at least one of the at least one scans; and at least one look-up table for storing a mask used by the printing device controller to control said ink jet nozzles during a given scan of the print device over a the printing medium, wherein the mask stored in the lookup table is regenerated for each of the at least one scans.

15. A printing system comprising:

at least one print head having ink jet nozzles for printing ink onto a printable medium as the nozzles scan at least once over the printable medium;

a user interface for storing information regarding ones of the ink jet nozzles determined to be malfunctional and displaying information which identifies the malfunctional ink jet nozzles; and a print device controller for controlling outputs of functioning ones of the ink jet nozzles based on the information stored in the user interface to compensate for the malfunctional ink jet nozzles in such a way that none of the functional ink jet nozzles are disabled to compensate for the malfunctional ink jet nozzles, and noncompensatory nozzle output and compensatory nozzle output from the functional ink jet nozzles both occur during at least one of the at least one scans; and at least one look-up table for storing a mask used by the printing device controller to control said ink jet nozzles during a given scan of the print device over a the printing medium, wherein the mask stored in the lookup table is regenerated for each of the at least one scans.

* * * * *